July 26, 1966  J. L. MUENCH  3,262,671
ADJUSTABLE SUPPORT FOR ROTATING EQUIPMENT
Filed Nov. 18, 1964  2 Sheets-Sheet 2

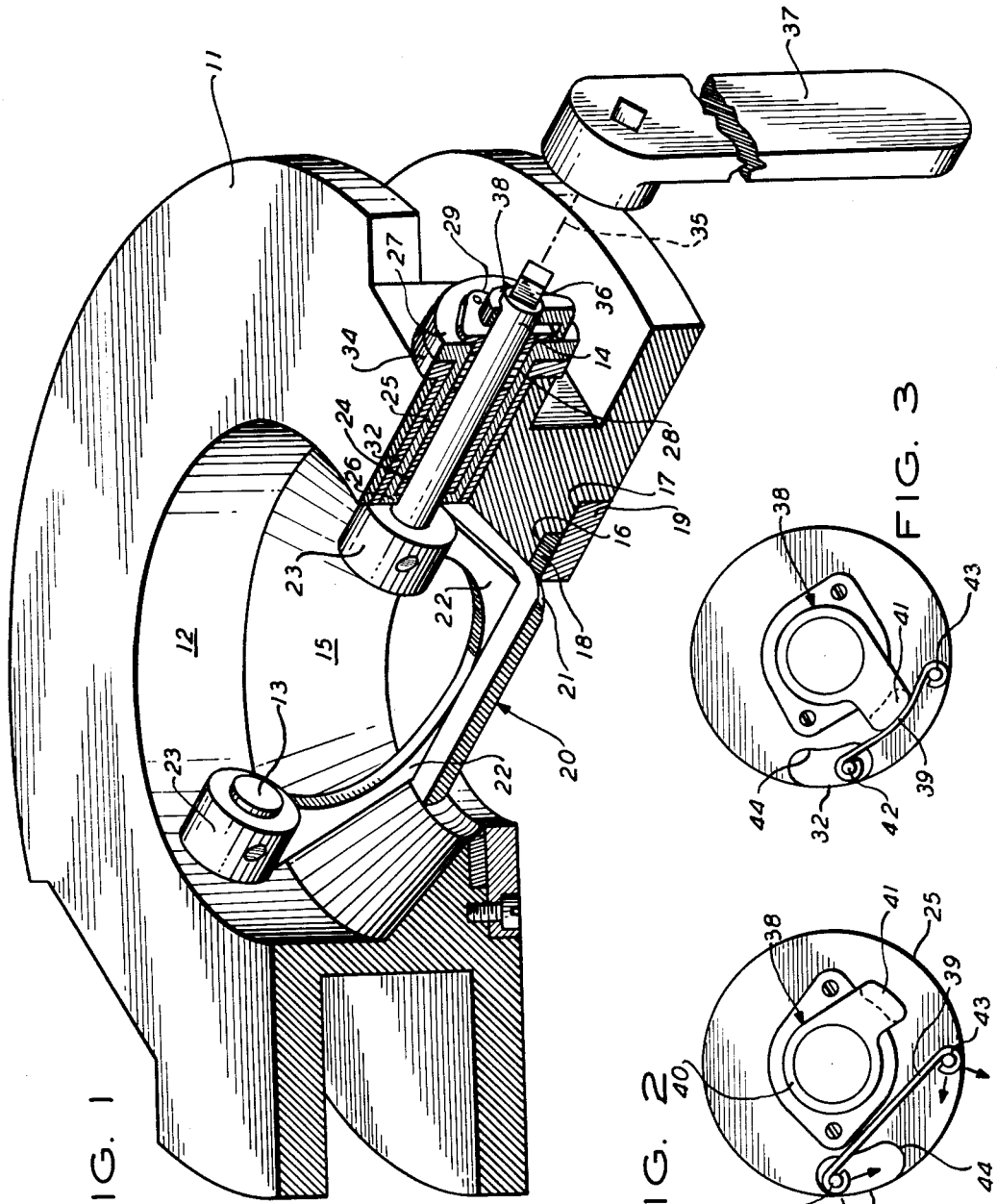

INVENTOR.
JOHN L. MUENCH
BY
Norman N. Poppu
attorney

United States Patent Office 3,262,671
Patented July 26, 1966

3,262,671
ADJUSTABLE SUPPORT FOR ROTATING EQUIPMENT
John L. Muench, 95 Fairchild Drive, Short Hills, N.J.
Filed Nov. 18, 1964, Ser. No. 412,041
2 Claims. (Cl. 251—163)

This invention relates generally to adjustable supports for rotating equipment, and particularly to adjustable mounting for a valve shaft, where minimal clearance of the valve with its seat is to be achieved.

It is an object of the invention to provide a convenient axial adjustment for rotating equipment.

It is yet a further object of the invention to provide double eccentric bushings that rotate together to provide an axial adjustment.

A further object of the invention is to provide rotational clearance for rotating equipment, and an adjustment for reducing that clearance to provide tight seating of the rotating equipment.

Yet another object of the invention is to provide a predetermined adequate rotational clearance that will continuously prevail during operation of a valve, and an adjustment that will establish a reduction of clearance for seating.

Among the further objects of the invention is to provide a valve which normally operates with full clearance of the valve seat, but which valve can be engaged with the valve seat at will for tight sealing; this is accomplished by an axial adjustment.

These objects and advantages as well as other objects and advantages may be attained by the device shown by way of illustration in the drawings in which:

FIGURE 1 is a partially sectioned perspective view of a valve, showing double eccentric bushings for axial adjustment;

FIGURE 2 is an end elevational view of the stop arm and adjustable bushing before valve clearance adjustment;

FIGURE 3 is the same as FIGURE 2, but after axial adjustment reducing clearance;

Figure 4:
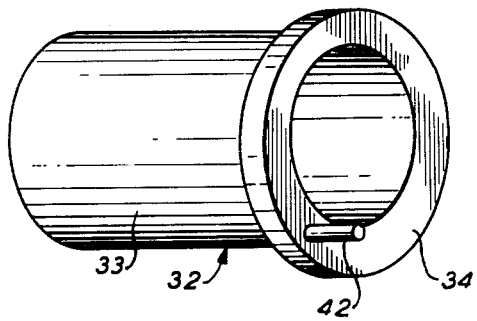
FIGURE 4 is a perspective view of an outer eccentric bushing.
Figure 5:
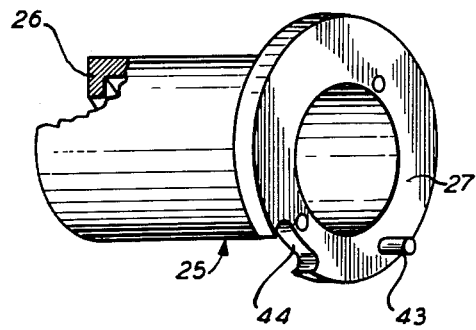
FIGURE 5 is a perspective view of an inner eccentric bushing.
Figure 6:
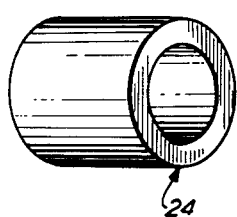
FIGURE 6 is a perspective view of a concentric bushing.
Figure 7:
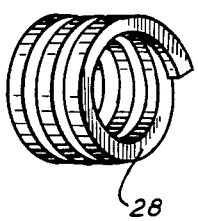
FIGURE 7 is a perspective view of packing.
Figure 8:
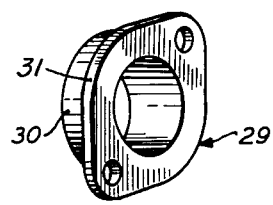
FIGURE 8 is a perspective view of a packing retainer.
Figure 9:
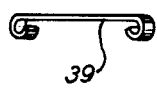
FIGURE 9 is a perspective view of a leaf spring.
Figure 10:
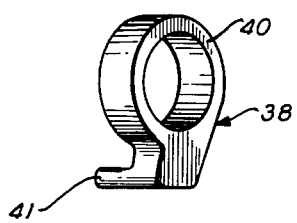
FIGURE 10 is a perspective view of an adjustment stop arm.

When rotating equipment is operated, it is often necessary to vary the axis of rotation to attain clearance for parts mounted on the shaft. For example, in order to seat a valve properly, the axis of rotation of the valve must be adjusted to firmly engage the valve in the seat. Having accomplished this adjustment, it may be found that the valve is not so precisely machined, or the axle is deformed so that the valve will not rotate into or out of place without binding with the seat.

It has been found that the axis of rotation of a rotating equipment may be easily adjusted if it has its axle mounted in a pair of rotatable bushings having opposing faces which are eccentirc with respect to the axis of rotation of the shaft. Thus, movement of one eccentric bushing only might cause the axis of rotation of the shaft to describe a generally circular figure; but the simultaneous rotation of a second eccentric bushing makes it possible to adjust the circular movement of the axis so that the axis of rotation can be moved simultaneously in a second direction in addition to its first generally circular movement. In this manner, the axis of rotation of the axle may be located at many positions beyond a simple circle provided by one eccentric bushing so as to bring a valve mounted on an axle into seated engagement by adjusting the bushings together. While reference has been had respecting a valve and its seating in a housing, it is to be understood that the double eccentric bushings are adaptable for all rotating equipment, where precise positioning of the axis of rotation is necessary, either for seating of a member mounted on an axle, or other purposes.

Referring now to the drawings in detail, the embodiment of the invention shows in FIGURE 1, a housing 11, for a valve hereinafter referred to. The housing 11 is positioned at the bottom of a hopper or similar vessel (not shown). It has a generally cylindrical wall 12, through which the portions of an axle 13, 14 pass. Below the cylindrical wall 12, there is a truncated conical wall 15. Two annular recesses 16, 17 are provided at the bottom of the conical wall 15. The first recess 16 receives a spherical sector which defines a valve seat 18. The second recess 17 receives a retaining ring 19, which when attached the the housing 11 by bolting or other suitable means, will attach the valve seat 18 in place.

A valve 20 is engaged with the valve seat 18. The engaged portion is a horizontal spherical sector 21 matching the seat 18 in edge configuration. The valve 20 has a generally perpendicular, somewhat arcuate, bifurcated enlargement, defining upstanding arms 22, 22 which terminate in the circular brackets 23, 23. These brackets 23, 23 have bores which embrace the axles 13, 14, and are attached thereto. The axle 14, where it passes through the housing 11, is first surrounded by a concentric bushing 24. An inner eccentric bushing 25 surrounds the concentric bushing 24. The inner bushing 25 has an internal flange 26 at the inner end, and an external radial flange 27. The bushing 24 is restrained at one end by the flange 26. The outer end of the first bushing 24 is followed by packing 28. A retainer 29 is carried by the axle 14, beyond the packing 28; the retainer 29 is attached to the external flange 27 to keep the packing 28 in place. The retainer 29 has a tubular portion 30, that enters the bushing 25, and surrounds the axle 14, and a radial flange 31 by means of which it is attached to the second flange 27. The flange 26 is positioned by engagement with the circular bracket 23.

An outer eccentric bushing 32 surrounds the second bushing 25. The body 33 of the bushing 32 is generally tubular, and has a radial flange 34 at its outer end, which is engaged between the housing 11 and the flange 27. The inner bushing 25 has an outer diameter which is eccentric and an inner diameter which is concentric with the axis of the shaft 14. The outer bushing 32 has an eccentric inner diameter and a concentric outer diameter. Thus, by rotating the inner and outer bushings with respect to each other, the axis of rotation 35 of the shaft 14 may be adjusted: (1) to move the valve 20 into position on the seat 18 with a minimum clearance, and (2) to be unseated for easy clearance so that it may be moved away a full 90°, to permit a full discharge. It is possible by this means to obtain a clearance of one thousandth of an inch, in closed position, and yet to adjust the axis of rotation 35 to permit the valve 20 to move away from the seat before it rotates to the open position.

This is accomplished by the pair of bushings 25, 32 having respectively external and internal opposing eccentric faces. The bushing 32 is adjusted to a position wherein the axis of rotation 35 gives sufficient clearance to valve 20 to freely rotate and clear the seat 18. The end of the axle 14 has a squared portion 36 to receive the crank 37, by which the valve is operated. Immediately before the squared portion, a stop arm 38 is mounted on the shaft 14 and rotatable therewith. When the valve 20 has been rotated to approximate closed position, as shown in FIGURE 1, the shaft 14 is rotated by the crank 37, thereby rotating the stop arm 38. The stop arm 38 engages a leaf spring 39 which is normally in the straight position shown in FIGURE 2. The stop arm 38 has a collar 40, and an arm 41 to engage the spring 39. The spring 39 is deformed, as shown in FIGURE 3. This accomplishes the rotation of both of the bushings 25, 32 which have opposing eccentric faces. One end of the spring 39 is attached to a pin 42 mounted on the flange 37 on the bushing 32, and the other end of the spring 39 is mounted on a pin 43 on the flange 27 on the bushing 25. The pin 42 is accommodated for movement in an arcuate cut out section 44 in the flange 27. The arm 41 deforms the spring 39, applying tension, pulling the pins 42, 43 toward each other. The inner and outer bushings 25, 32 rotate in opposite directions, and produce a motion of the axle 14 whereby the valve 20 is pressed against the seat 18. When the arm 41 is again rotated, tension on the spring 39 is released, and the bushings 25, 32 rotate, being urged by the spring 39 that returns to its normal straight position. The valve is thereby moved away from tight sealing engagement with the seat 18, and there is adequate clearance for it to be rotated by manipulation of the crank 37.

The provision of a double eccentric bushing as an adjustable bearing mount for rotating equipment, can provide the means for adjusting the axis of rotation of many pieces of rotating equipment, so that parts mounted on the axis can describe the preferred rotational track with adequate clearance of any other members of the assemblage, and then move into engagement with or part of apparatus.

When the device is assembled and before the pins 42, 43 are installed, the outer and inner bushings 25, 32 are test rotated until they firmly seat the valve 20 on the seat 18. They are then each moved, the outer bushing 32 clockwise and the inner bushing 25 until the valve 20 is backed off from the seat. The pins 25, 32 are then installed in the flanges 27, 34 so that the spring 39 can be installed undeformed. The engagement of the arm 41 deforms the spring 39, rotates the pins 25, 32 and eccentric bushings 25, 32 to seat the valve 20 on the seat 18.

The foregoing embodiment of the inventive concept is intended merely to be illustrative, for many changes may be made in the construction, selection and arrangement of the parts, for other adjustably supported structure, all within the scope of the appended claims without departing from the spirit of the invention.

What is claimed:
1. An adjustable support for rotating equipment comprising:
 (a) a housing;
 (b) a pair of coaxial shafts mounted for rotation on the housing;
 (c) inner bushings mounted on each shaft, and having an inner eccentric diameter and an outer eccentric diameter;
 (d) outer bushings mounted on each shaft and having an inner eccentric diameter and an outer concentric diameter, and mounted on the inner bushing;
 (e) pins mounted on each inner and outer bushing;
 (f) springs connecting the pins on each pair of inner and outer bushings;
 (g) rotatable arms, affixed to each shaft and movable into deforming engagement with each spring, whereby the bushings are rotated with respect to each other;
 (h) a valve seat in the housing;
 (i) a valve mounted on the shafts;
 (j) the rotation of the inner and outer bushings shifting the axis of rotation of the shafts to alter the clearance of the valve with the valve seat.

2. An adjustable support for rotating equipment comprising:
 (a) a rotatable shaft;
 (b) an inner bushing mounted on the shaft and having an inner concentric diameter and an outer eccentric diameter;
 (c) an outer bushing having an inner eccentric diameter and an outer concentric diameter mounted on the inner bushing;
 (d) a spring connecting the bushings together;
 (e) a rotatable arm affixed to the shaft and movable therewith into deforming engagement with the spring whereby the bushings are rotated.

References Cited by the Examiner

UNITED STATES PATENTS

| | | | |
|---|---|---|---|
| 1,595,038 | 8/1926 | Vencl | 251—158 |
| 2,290,332 | 7/1942 | Johnson | 251—160 |
| 2,612,338 | 9/1952 | Flosdorf | 251—158 |
| 2,673,061 | 3/1954 | Broz | 251—163 X |
| 2,811,981 | 11/1957 | Harris | 251—161 X |

WILLIAM F. O'DEA, *Primary Examiner.*

CLARENCE R. GORDON, *Examiner.*